Jan. 21, 1969 R. L. GAMBLIN ET AL 3,423,741

MEMORY ADDRESSER IN A MICROWAVE READOUT SYSTEM

Filed Oct. 22, 1965

INVENTORS.
RODGER L. GAMBLIN
PHILIP A. LORD

BY Ronald J. Clark
ATTORNEY

United States Patent Office 3,423,741

Patented Jan. 21, 1969

3,423,741

MEMORY ADDRESSER IN A MICROWAVE READOUT SYSTEM

Rodger L. Gamblin and Philip A. Lord, Vestal, N.Y., assignors to International Business Machines Corporation, Armonk, N.Y., a corporation of New York Filed Oct. 22, 1965, Ser. No. 500,575

U.S. Cl. 340—174 5 Claims

Int. Cl. G11b 5/00

This invention relates in general to magnetic storage addressing systems and, more particularly, to a magnetic storage addressing system comprising a plurality of separate memory groups wherein each group employs a plurality of distinct frequency responsive storage elements.

Various core select systems for addressing a single core or a group of associated cores are generally well known. From the time of their discovery, select systems have undergone continuous refinement in order to reduce the number of drivers, decoding circuits and sense amplifiers required to instrument a desired memory size.

It is an object of the instant invention to provide a simplified magnetic storage addressing system employing a single addressing circuit for a plurality of memory groups.

It is another object of the instant invention to provide an improved magnetic storage addressing system employing a plurality of frequency responsive memory elements for each group in the memory and a corresponding microwave oscillator for each group.

It is a further object of the instant invention to provide an improved magnetic storage addressing system employing separate frequency responsive memory elements for each group, wherein the frequency responsive characteristic is altered by the selective use of various ferrite materials having different gyromagnetic resonant absorption frequencies.

Briefly, these and other objects of the instant invention are achieved through the combination of a plurality of memory planes employing separate resonant absorption memory elements responsive only to a specific frequency of a microwave signal. Corresponding elements in each plane are connected together and to a common sense amplifier. Each plane is further subdivided into a plurality of branches and all the elements in a branch are sampled by the microwave signals generated by a single oscillator. Since only one plane is sampled by a specific frequency, each branch is equipped with a plurality of oscillators. Selection of any one branch is achieved by addressing that oscillator which corresponds to the plane storing the desired information.

Figure 2:
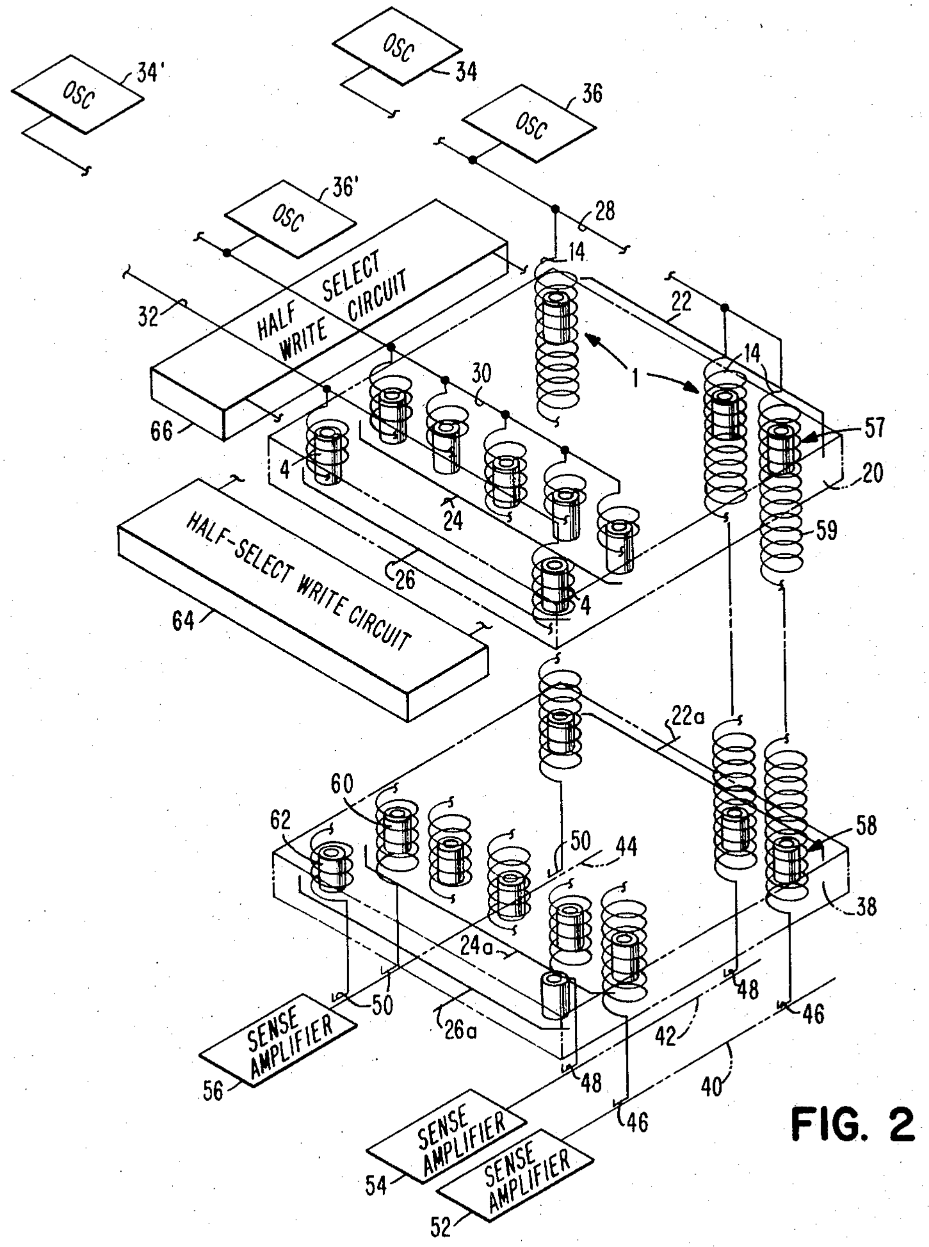
Figure 1:
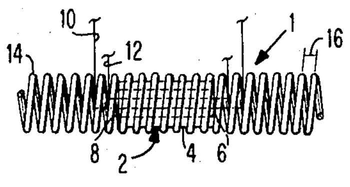

The foregoing and other objects, features and advantages of the invention will be apparent from the following more particular description of preferred embodiments of the invention, as illustrated in the accompanying drawings, wherein FIG. 1 is a side view of an individual memory element; and FIG. 2 is a schematic view of a plurality of memory elements arranged according to the principles of the instant invention.

The same numerals identify similar elements in the same view and in the several views.

Referring briefly to FIG. 1, there can be seen an individual cylindrically shaped memory storage element 1 including a ferrite toroid 2 having an outer wall 4 and an inner wall 6. The inner wall 6 forms a central bore 8 in which drive wires 10 and 12 are located for switching the toroid 2 to either of its two stable states by use of partial select drive pulses applied simultaneously thereto. A helical coil 14 is shown wrapped around or plated upon the toroid 2 and is formed by a plurality of turns having a substantially equal distance 16 between adjacent turns. In order to vary the resonant frequency of a toroid various ferrite materials are substituted for all the toroids in one plane. Each material has a substantially stable frequency response characteristic.

Referring to FIG. 2, there can be seen a schematic diagram of the instant invention employing a plurality of ferrite storage elements capable of exhibiting a gyromagnetic resonant frequency when magnetized in either of its two stable states. A plurality of storage elements 1 in a first group or plane 20 are arranged in a plurality of branches 22, 24 and 26, and are connected together by separate strip lines 28, 30 and 32 respectively, suitable for transmitting microwave signals thereover. Although each branch is shown having different numbers of elements, it has been found experimentally that at least seventy-two elements can be connected in a single branch. Each of the strip lines is equipped with a separate microwave oscillator 34 and 36 for each group in the memory and each oscillator operates at a distinct frequency corresponding to the gyromagnetic resonant frequency of the storage elements in each memory group. A second group 38 is shown positioned electrically beneath the group 20 comprising corresponding branches **22*a*, 24*a* and 26*a*. More specifically a plurality of branches are connected in parallel to form a group and each branch is equipped with a plurality of oscillators. There is one oscillator in each branch for each group in the system. An intervening plane is constructed by connecting an additional storage element to each corresponding element in the first plane. Connections are made between helical coils 14. The final plane is constructed by connecting an additional storage element to each corresponding element in the intervening plane and by connecting adjacent elements in each group to a plurality of second strip lines 40, 42 and 44 by direction couplers 46, 48 and 50, respectively. Each of the strip lines 40, 42 and 44 are connected to a sense amplifier 52, 54 and 56, respectively. Corresponding elements are those positioned in different groups and connected together by the same helical coil. For example, an element 57 in the group 20 is connected to a corresponding element 58 in the group 38 by a helical coil 59. Adjacent elements are those positioned in the final group in adjacent branches and transmitting energy to a common strip line. For example, an element 60 in the group 38 is adjacent to an element 62 since they both transmit energy to the strip line 44**.

In operation, means not shown select one of the microwave oscillators. For this example, the desired word is located in the group 38 and the analogous oscillator 36 generates the frequency needed to sample the state of the elements in the branch **22*a*. The output of the selected oscillator travels down its associated strip line 28 and is equally divided into the coils 14 connected thereto. The helical coils generate a highly circular magnetic field having a certain sense of rotation and a certain frequency of rotation. Each of the elements positioned in the branch line reside in a certain remnant state of magnetization. In this magnetic state, certain electrons are coupled together and rotating within the magnetized material at a fixed precessional rate. Coupling occurs between the processing electrons in an element and the magnetic field when both rotate the same direction and at substantially the same frequency. The branch 22*a*** meets the frequency requirement and it is interrogated in the non-destructive read out mode. Those cores meeting the rotational requirement absorb the energy in the magnetic field within the helix. The sense amplifiers determine which cores absorb the microwave energy and which cores do not and prepare this information for use to a utilization circuit, not shown, as all standard sense amplifiers operate.

To change the magnetic state of any element, a standard half select write circuit 64 and 66 switch each of the cores 2, by wires not shown, from one stable state of magnetization to its second stable state of magnetization.

A complete description of the above-mentioned microwave absorption phenomenon is found in a co-pending U.S. patent application, S.N. 502,008 and assigned to the assignee of the instant invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory addressing system comprising,
a plurality of microwave absorption elements having an integral gyromagnetic absorption frequency and arranged in a plurality of groups and a plurality of branches,
each of said groups comprising elements having different integral gyromagnetic absorption frequencies,
a plurality of microwave oscillators connected to each of said branches,
each of said oscillators being employed to generate a microwave signal analogous to one of said gyromagnetic absorption frequencies,
means for activating one of said oscillators, and
a sensing means responsive to corresponding elements in each group.

2. A memory addressing system as recited in claim 1 wherein each of said elements further includes a helical coil and connection between corresponding elements in said groups are made by said coils.

3. A memory addressing system comprising,
a plurality of ferrite toroids having an integral gyromagnetic absorption frequency and arranged in a plurality of groups and a plurality of branches,
each of said groups comprising toroids having different gyromagnetic absorption frequencies,
means for selectively magnetizing each of said toroids to a first stable state and a second stable state,
a helical coil wrapped around corresponding toroids in each of said groups,
a plurality of microwave oscillators connected to said coils in certain of said branches,
each of said oscillators being employed to generate a microwave signal analogous to one of said gyromagnetic absorption frequencies,
means for activating one of said oscillators, and
sensing means responsive to corresponding elements in each group.

4. A memory addressing system comprising,
a plurality of ferrite toroids having an integral gyromagnetic resonant absorption frequency and being formed with an outer wall and an axial bore,
said toroids being arranged into a plurality of groups and a plurality of branches, each of said groups comprising toroids having different gyromagnetic resonant absorption frequencies,
first means for selectively magnetizing each of said toroids to a first stable state of remnant magnetizations and to a second stable state of remnant magnetization,
said magnetized ferrite having electrons with a first sense of rotation and a first period of rotation corresponding to its integral absorption frequency and its first stable state of remnant magnetization and having electrons with a second sense of rotation and said period of rotation corresponding to its integral absorption frequency and its second stable state of remnant magnetization,
a plurality of microwave oscillators each operating at substantially each of said resonant absorption frequencies connected to each of said branches,
a plurality of helical coils wrapped around corresponding toroids in each of said groups and responsive to said oscillators for circularly polarizing said microwave signals in said first sense of rotation,
means for activating one of said oscillators, and
a plurality of sensing means responsive to corresponding elements in each group for sampling the state of each toroid in a single branch in one group.

5. A memory addressing system comprising,
a plurality of magnetized microwave absorption elements having an integral gyromagnetic resonant absorption frequency and arranged in a plurality of groups and a plurality of branches,
each of said groups comprising elements having different integral gyromagnetic absorption frequencies,
a plurality of microwave oscillators connected to each of said branches,
corresponding elements in each branch in one group being connected to corresponding elements in each branch in the remaining groups,
each of said oscillators being employed to generate a microwave signal analogous to one of said gyromagnetic resonant absorption frequencies,
means for activating one of said oscillators and
a sensing means responsive to corresponding elements in each group.

References Cited

UNITED STATES PATENTS

| | | | |
|---|---|---|---|
| 2,911,554 | 11/1959 | Kompfner et al. | 333—24 XR |
| 3,248,556 | 4/1966 | Hartman | 307—88 |

OTHER REFERENCES

Kriz, T. A.: Microwave Readout of Ferrite Memory Storage, IEEE Transaction on Electronic Computers, February 1965, pp. 75–76.

BERNARD KONICK, *Primary Examiner.*

GARY M. HOFFMAN, *Assistant Examiner.*